United States Patent [19]

Blanpain et al.

[11] Patent Number: 5,015,713

[45] Date of Patent: May 14, 1991

[54] ALKALINE POLYMERIZATION OF CARBOXYLATED POLYMERS

[75] Inventors: Peter R. J. Blanpain, Elst; Hendrikus W. Leenders, Arnhem, both of Netherlands

[73] Assignees: Polysar Financial Services S.A., Fribourg, Switzerland; BASF Aktiengesellschaft, Ludwigshafen, Fed. Rep. of Germany

[21] Appl. No.: 342,675

[22] Filed: Apr. 26, 1989

Related U.S. Application Data

[63] Continuation of Ser. No. 183,048, Apr. 19, 1988, abandoned.

[51] Int. Cl.$^5$ ............................................. C08F 20/04
[52] U.S. Cl. ................................. 526/318.4; 526/240; 525/327.8
[58] Field of Search ............................ 526/318.4, 240; 525/327.8

[56] References Cited

U.S. PATENT DOCUMENTS

| | | | |
|---|---|---|---|
| 2,868,754 | 1/1959 | Eilbeck et al. | 524/821 |
| 3,657,378 | 1/1969 | Volk et al. | 526/240 |
| 4,024,040 | 5/1977 | Phalangas et al. | 526/240 |
| 4,065,423 | 12/1977 | Hen | 260/29.7 H |
| 4,540,739 | 9/1985 | Midgley | 524/818 |
| 4,563,497 | 1/1986 | Masanek et al. | 526/240 |
| 4,649,183 | 3/1987 | McCormick et al. | 526/240 |

FOREIGN PATENT DOCUMENTS 766365 10/1971 Belgium .

Primary Examiner—Joseph L. Schofer
Assistant Examiner—Alex H. Walker
Attorney, Agent, or Firm—Stevens, Davis, Miller & Mosher

[57] ABSTRACT

Polymers containing acryloyloxy monomers may be prepared by emulsion polymerization at alkaline pH. This permits the use of unlined mild steel reactors to polymerize functional containing monomers.

4 Claims, No Drawings

ALKALINE POLYMERIZATION OF CARBOXYLATED POLYMERS

This application is a continuation of application Ser. No. 183,048, filed Apr. 19, 1988, now abandoned.

FIELD OF THE INVENTION

The present invention relates to a process for the preparation of carboxylated polymers at alkaline pH.

BACKGROUND OF THE INVENTION

Carboxylated emulsion polymers such as Sinclair-Koppers K-55E latex have been known since the early 1950's. Such latices had enhanced chemical and mechanical stability. Additionally, such polymers provide improved binding power as they are self crosslinking.

While the polymers per se are extremely useful, they have had to be prepared under acidic conditions. This necessitated using glass lined or stainless steel reactors.

Since the early 1970's polymer chemists and process engineers have been seeking ways to produce carboxylated polymers at alkaline pH's.

One of the early attempts in this area is disclosed in Hoechst's Belgium Patent 766,365 published Apr. 27, 1971. This patent discloses polymerizing a styrene butadiene monomer mixture to 75–97% conversion at alkaline pH then adding a mixture of unsaturated acid and styrene and continuing the polymerization to complete conversion. Various other attempts have been made to sequence the polymerization so that the acid is incorporated over a relatively short period of time. Most of these procedures have not met with extensive commercial application. One of the problems is that it is still necessary to carry out at least a portion of the polymerization at acid pH's.

U.S. Patent 4,065,423 issued Dec. 27, 1977 in the name of Uhiroyal Inc. discloses polymers containing acryloyloxy carboxylic acid monomers. This patent also teaches that the emulsion polymerization must be carried out at a pH from 1.5 to 7.0 preferably from 3 to about 5 (col. 4, lines 34–35).

Applicant discovered that acryloyloxy carboxylic acid type monomers may be polymerized at pH's in excess of 7.5, preferably in the range of 8–11. The polymerization need not be conducted in glass lined or stainless steel reactors.

SUMMARY OF THE INVENTION

The present invention provides in a process for the emulsion polymerization of a monomer mixture selected from the group consisting of:
(A) monomer mixtures comprising:
 (i) from 20 to 80 weight percent of a mixture comprising 100 to 75 weight percent of one or more $C_{8-12}$ vinyl aromatic monomers which are unsubstituted or substituted by a $C_{1-4}$ alkyl radical or a chlorine atom and 0 to 25 weight percent of one or more $C_{2-8}$ alkenyl nitriles;
 (ii) from 85 to 19.5 weight percent of one or more $C_{4-6}$ conjugated diolefins which are unsubstituted or substituted by a chlorine atom;
 (iii) from 0.5 to 10 weight percent of one or more monomers of the formula:

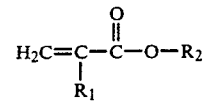

wherein $R_1$ is hydrogen or a $C_{1-6}$ alkyl radical and $R_2$ a radical of the formula
 (a)

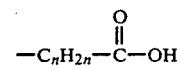

wherein n is an integer from 1 to 6; or
 (b)

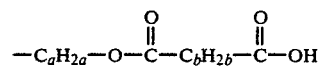

wherein a and b are integers from 1 to 4; and
 (iv) optionally up to 20 weight percent of one or more monomers selected from the group consisting of:
  (a) $C_{1-8}$ alkyl and hydroxyalkyl esters of $C_{3-6}$ ethylenically unsaturated carboxylic acids;
  (b) $C_{3-6}$ ethylenically unsaturated aldehydes; and
  (c) amides of $C_{3-6}$ ethylenically unsaturated carboxylic acids which amides are unsubstituted or substituted at the nitrogen atom by up to two radicals selected from the group consisting of $C_{1-4}$ alkyl and $C_{1-4}$ hydroxyalkyl radicals;
(B) monomer mixtures comprising:
 (i) at least 75 weight percent of a monomer mixture comprising 100 to 80 weight percent of one or more monomers selected from the group consisting of $C_{1-8}$ alkyl or hydroxyalkyl esters of $C_{3-6}$ ethylenically unsaturated carboxylic acids; and up to 20 weight percent of one or more monomers selected from the group consisting of $C_{8-12}$ vinyl aromatic monomers which are unsubstituted or substituted by a $C_{1-4}$ alkyl radical or a chlorine atom and $C_{2-8}$ alkenyl nitriles;
 (ii) from 0.5 to 25 weight percent of one or more monomers of Formula I as defined above;
 (iii) optionally up to 20 weight percent of one or more monomers selected from the group consisting of:
  (a) $C_{3-6}$ ethylenically unsaturated aldehydes; and
  (b) amides of $C_{3-6}$ ethylenically unsaturated carboxylic acids which amides are unsubstituted or substituted at the nitrogen atom by up to two radicals selected from the group consisting of $C_{1-4}$ alkyl and $C_{1-4}$ hydroxyalkyl radicals;
(C) monomer mixtures comprising:
 (i) from 5 to 39.5 weight percent of one or more $C_{2-3}$ olefins; comprising:
  100 to 80 weight percent of one or more monomers selected from the group consisting of $C_{1-8}$ alkyl or hydroxyalkyl esters of $C_{3-6}$ ethylenically unsaturated carboxylic acid;
  and up to 20 weight percent of a $C_{8-12}$ vinyl aromatic monomer which is unsubstituted or substituted by a $C_{1-4}$ alkyl radical or a chlorine atom;
 (iii) from 0.5 to 10 weight percent of a monomer of Formula I as defined above; and
 (iv) optionally up to 20 weight percent of one or more monomers selected from the group consisting of:
  (a) $C_{3-6}$ ethylenically unsaturated aldehydes; and (b) amides of $C_{3-6}$ ethylenically unsaturated carboxylic acids which amides are unsubstituted or substituted at the nitrogen atom by up to two radicals selected from the group consisting of $C_{1-4}$ alkyl and $C_{1-4}$ hydroxyalkyl radicals;

(D) monomer mixtures comprising:
  (i) from 5 to 39.5 weight percent of a mixture comprising 100 to 75 weight percent of one or more $C_{2-8}$ alkenyl nitriles, and 0 to 25 weight percent of one or more $C_{8-12}$ vinyl aromatic monomers which is unsubstituted or substituted by a $C_{1-4}$ alkyl radical, or a chlorine atom;
  (ii) from 94.5 to .60 weight percent of one or more $C_{4-6}$ conjugated diolefins which are unsubstituted or substituted by a chlorine atom;
  (iii) from 0.5 to 10 weight percent of a monomer of Formula I as defined above; and
  (iv) optionally up to 20 weight percent of one or more monomers selected from the group consisting of:
    (a) $C_{1-8}$ alkyl and hydroxyalkyl esters of $C_{3-6}$ ethylenically unsaturated carboxylic acids;
    (b) $C_{3-6}$ ethylenically unsaturated aldehydes; and
    (c) amides of $C_{3-6}$ ethylenically unsaturated carboxylic acids which amides are unsubstituted or substituted at the nitrogen atom by up to two radicals selected from the group consisting of $C_{1-4}$ alkyl and $C_{1-4}$ hydroxyalkyl radicals;

(E) monomer mixtures comprising:
  (i) from 99.5 to 70 weight percent of a monomer mixture comprising:
    (a) from 100 to 80 weight percent of one or more halogenated $C_{2-6}$ aliphatic alkenyl monomers and
    (b) up to 20 weight percent of one or more monomers selected from the group consisting of $C_{1-8}$ alkyl and hydroxy alkyl esters of $C_{3-6}$ ethylenically unsaturated carboxylic acids;
  (ii) from 0.5 to 29.5 weight of one or more monomers of Formula I as defined above; and
  (iii) optionally up to 20 weight percent of one or more monomers selected from the group consisting of:
    (a) $C_{3-6}$ ethylenically unsaturated aldehydes; and
    (b) amides of $C_{3-6}$ ethylenically unsaturated carboxylic acids which amides are unsubstituted or substituted at the nitrogen atom by up to two radicals selected from the group consisting of $C_{1-4}$ alkyl and $C_{1-4}$ hydroxyalkyl radicals;

the improvement characterized in that the polymerization takes place at a pH of greater than 7.5.

The present invention also provides the above polymers.

DETAILED DESCRIPTION

The polymers which may be polymerized in accordance with the present invention may be characterized as carboxylated styrene butadiene type polymers, carboxylated acrylate type polymers, carboxylated nitrile type polymers and carboxylated vinyl(idene) chloride type polymers.

Generally, carboxylated styrene-butadiene type polymers comprise:
from 20 to 80, preferably from 40 to 70 weight percent of a mixture comprising 100 to 75, preferably 100 to 80 weight percent of one or more $C_{8-12}$ vinyl aromatic monomers which are unsubstituted or substituted by a $C_{1-4}$ alkyl radical or a chlorine atom, and from 0 to 25, preferably less than 20 weight percent of a $C_{2-8}$ alkenyl nitrile;

from 79.5 to 19.5, preferably from 60 to 29.5 weight percent of one or more $C_{4-6}$ conjugated diolefins which are unsubstituted or substituted by a chlorine atom; and from 0.5 to 10, preferably from 0.5 to 5, weight percent of one or more monomers of the Formula I

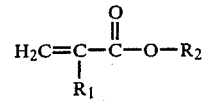

wherein $R_1$ is hydrogen or a $C_{1-6}$ alkyl radical and $R_2$ a radical of the formula
(a)

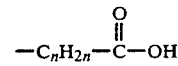

wherein n is an integer from 1 to 6; or
(b)

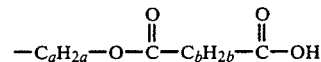

wherein a and b are integers from 1 to 4;

Optionally, the polymer may also contain up to about 20, preferably less than 10, most preferably from 0.5 to 5 weight percent of one or more functional monomers selected from the group consisting of:
(a) $C_{1-8}$ alkyl and hydroxyalkyl esters of $C_{3-6}$ ethylenically unsaturated carboxylic acids;
(b) $C_{3-6}$ ethylenically unsaturated aldehydes; and
(c) amides of $C_{3-6}$ ethylenically unsaturated carboxylic acids, which amides are unsubstituted or substituted at the nitrogen atom by up to two radicals selected from the group consisting of $C_{1-4}$ alkyl and $C_{1-4}$ hydroxyalkyl radicals.

$C_{8-12}$ vinyl aromatic monomers include styrene and alpha methyl styrene. $C_{4-6}$ conjugated diolefins include butadiene, isoprene, and chloroprene. The compounds of Formula I are acryloyloxy carboxylic acids. These compounds include alpha-acryloyloxy acetic acid beta-acryloyloxy propionic acid; beta-methylacryloyloxy propionic acid; alpha-methacryloyloxy acetic acid, gamma-acryloyloxy butanoic acid and gamma-methacryloyloxy butanoic acid and the higher propyloyloxy- and butyloyloxy-homologues of these compounds.

Suitable functional monomers include acrolein, methyl acrylate, ethyl acrylate, butyl acrylate, methyl methacrylate; ethyl methacrylate, butyl methacrylate, hydroxyethyl acrylate, ethylhexyl acrylate, hydroxyethyl methacrylate, ethylhexyl methacrylate; acrylamide, methacrylamide, N-methylol acrylamide, and N-methylol-methacrylamide.

The carboxylated acrylate type polymers which may be prepared in accordance with the present invention comprise:
at least 75, preferably at least 85 weight percent of a mixture comprising:
100 to 80 weight percent of one or more monomers selected from the group consisting of $C_{1-8}$ alkyl or hydroxyalkyl esters of $C_{3-6}$ ethylenically unsaturated carboxylic acids and up to 20, preferably less than 15 weight percent of one or more monomers selected from the group consisting of $C_{8-12}$ vinyl aromatic monomers which are unsubstituted or substituted by a $C_{1-4}$ alkyl radical or a chlorine atom, and $C_{2-8}$ alkenyl nitriles;

up to 25, preferably less than 15 weight percent of a monomer of Formula I as described above; and optionally up to 20, preferably from 0.5 to 10, most preferably from 0.5 to 5 weight percent of one or more of the functional monomers discussed above other than the $C_{1-8}$ alkyl or hydroxyalkyl esters of $C_{3-6}$ ethylenically unsaturated carboxylic acids.

Useful $C_{1-8}$ alkyl and hydroxy alkyl esters of $C_{3-6}$ ethylenically unsaturated carboxylic acids include methyl acrylate, ethyl acrylate, butyl acrylate, methyl methacrylate; ethyl methacrylate, butyl methacrylate, hydroxyethyl acrylate, ethylhexyl acrylate, hydroxyethyl methacrylate, ethylhexyl methacrylate.

Vinyl aromatic monomers have been discussed above.

The ethylene acrylate type polymers comprise: (i) 5 to 40, preferably 10 to 35 weight percent of a $C_{2-3}$ olefin;

(ii) from 94.5 to 59.5, preferably from 80 to 64.5 weight percent of a monomer mixture comprising 100 to 80 weight percent of one or more monomers selected from the group consisting of $C_{1-8}$ alkyl or hydroxy alkyl esters of $C_{3-6}$ ethylenically unsaturated carboxylic acids; and up to 20 weight percent of one or more monomers selected from the group consisting of $C_{8-12}$ vinyl aromatic monomers which are unsubstituted or substituted by a $C_{1-4}$ alkyl radical or a chlorine atom;

(iii) from 0.5 to 10, preferably from 0.5 to 5 weight percent of one or more monomers of Formula I as defined above; and (iv) optionally up to 20, preferably from 0.5 to 10, most preferably from 0.5 to 5 weight percent of one or more of the functional monomers discussed above other than the $C_{1-8}$ alkyl and hydroxyalkyl esters of $C_{3-6}$ ethylenically unsaturated carboxylic acids.

Useful $C_{2-3}$ olefins are ethylene and propylene. $C_{1-8}$ alkyl and hydroxy alkyl esters of $C_{3-6}$ ethylenically unsaturated carboxylic acids have been discussed above. $C_{8-12}$ vinyl aromatic monomers have been discussed above.

The carboxylated nitrile type polymers comprise:
(i) from 5 to 39.5, preferably from 20 to 40 weight percent of a mixture comprising 100 to 75, preferably 100 to 80 weight percent of one or more $C_{2-8}$ alkenyl nitriles and from 0 to 25, preferably less than 20 weight percent of a $C_{8-12}$ vinyl aromatic monomer which is unsubstituted or substituted by a $C_{1-4}$ alkyl radical or a chlorine atom;

(ii) from 94.5 to 60, preferably from 79.5 to 59.5 weight percent of one or more $C_{4-6}$ conjugated diolefins which are unsubstituted or substituted by a chlorine atom;

(iii) from 0.5 to 10, preferably from 0.5 to 5 weight percent of one or more monomers of Formula I as discussed above; and (iv) up to 20, preferably from 0.5 to 10, most preferably from 0.5 to 5 weight percent of one or more of the functional monomers as discussed above.

Apart from the alkenyl nitrile monomers, useful monomers have been discussed above. Nitrile monomers include acrylonitrile and methacrylonitrile.

The carboxylated vinyl(idene) type polymers comprise:
(i) from 99.5 to 70, preferably from 99.5 to 80 weight percent of a monomer mixture comprising:

(a) from 100 to 80 weight percent of one or more halogenated $C_{2-6}$ aliphatic alkenyl monomers, and (b) up to 20 weight percent of one or more monomers selected from the group consisting of $C_{1-8}$ alkyl and hydroxyalkyl esters of $C_{3-6}$ ethylenically unsaturated carboxylic acids;

(ii) from 0.5 to 29.5, preferably from 0.5 to 19.5, most preferably from 0.5 to 10, particularly from 0.5 to 5, weight percent of one or more monomers of Formula I as defined above; and (iii) optionally up to 20, preferably from 0.5 to 10, most preferably from 0.5 to 5 weight percent of one or more functional monomers described above.

The monomers of Formula I, the alkyl and hydroxyalkyl esters, and the functional monomers have been discussed above. Suitable halogenated $C_{2-6}$ aliphatic alkenyl monomers include vinyl and vinylidene chloride.

Emulsion polymerization is conducted in an aqueous media. Generally, the monomers are dispersed in water with a surfactant. The surfactant is usually anionic or non-ionic if the functional species in the polymer contain a negative charge such as carboxylic acid groups. The surfactant may be synthetic such as a sulfate or sulfonate surfactant. These surfactants tend to have long chain alkyl, alkenyl or aryl alkyl back bones. The emulsifier may be a mixed type such as a fatty acid derivitive of a sulfosuccinate. The surfactant may be a fatty acid such as a sodium or potassium stearate, or palmate (palmitate). Generally, such fatty acid surfactants become less effective at pH's below about 8.5. The emulsifier may be a non-ionic emulsifier. Generally, these emulsifiers comprise a polyalkylene oxide, usually polyethylene or polypropylene oxides. The surfactant may further contain an alkyl radical or an ester radical such as a sorbitan monstearate, or a fatty acid radical such as a stearate. Different types of surfactant as previously discussed may be employed alone or in combinations. Useful emulsifiers are listed in a number of texts including McCutcheon's Detergents & Emulsifiers published annually (North American & European editions) by the McCutcheon Division, Mc Publishing Co., Glen Rock N.J.

The polymerization may be a batch process in which the entire dispersion of monomers in water is put in a reactor; it may be an incremental process in which a portion of the monomer mixture, soap and water is added to the reactor and the polymerization is initiated; or it may be continuous using a chain of two or more reactors. The remaining monomers and soap solutions, if any, may be added to the reactor over a period of time. This may permit the formation of domains within the polymer. The process may be a seeded process in which a small amount usually less than 5% of a seed polymer is added to the reactor prior to initiation. In some cases the seed may be formed insitu.

The reaction is initiated by a free radical. The free radical may be generated by the thermal decomposition of a water soluble compound such as a persulfate, or an oil soluble compound such as azobisisobutyronitrile (AIBN). Generally, such polymerizations are hot and are conducted at temperatures from 40 to 95° C.

The polymerization may also be carried out as a cold process at temperatures less than about 40° C but greater than the freezing temperatures of the emulsion. Cold polymerizations may be conducted at temperatures from about −5 to 35° C., preferably from about 5 to 25° C. The lower temperature systems may require the presence of an agent to lower the freezing point of the monomer emulsion, such as methanol.

The reaction may be initiated at low temperatures by using a redox pair to generate free radicals such as a peroxide and a reducing agent.

The emulsion may also contain small amounts, usually less than 1, most preferably less than 0.5 weight percent of an electrolyte. This helps control particle size and helps maintain a charge balance within the emulsion. The emulsion may also contain a sequestering agent, particularly if hard water is used to form the emulsion. Usually it is desirable to modify the molecular weight distribution of the polymer produced. This may be achieved through the use of a modifier or chain transfer agents such as straight or branch chained $C_{8-16}$ alkyl mercaptans, carbon tetrachloride, or similar products; alone or in combination as is well known in the art.

The polymerization may take from 5 to 16 hours depending on the process used and the reaction conditions.

There are many texts which discuss emulsion polymerization including: Emulsion Polymerization Theory and Practice, D. C. Blackly, John Wiley and Sons, N.Y.; Principles of Polymer Chemistry, Paul J. Flory, Cornell University Press; and Emulsion Polymerization, Irja Piirma, Academic Press.

In accordance with the present invention the pH of the emulsion may be greater than about 7.5, preferably from 8 to 11, most preferably from 8 5 to 10. The pH of the emulsion may be adjusted with common organic and inorganic bases. Useful organic bases include ammonia, ammonium salts such as ammonium hydroxide, and lower ($C_{1-6}$) alkyl and hydroxyalkyl amines such as ethanol amine. Useful inorganic bases include alkali and alkaline earth salts such as sodium, and potassium hydroxide.

After polymerization the resulting latex may be concentrated and various post additives such as biocides, and additional surfactants, are usually added to the latex. The latex pH is adjusted to an appropriate value.

The following examples are intended to illustrate the invention and are not intended to limit it. In the examples parts are parts by weight unless otherwise specified.

EXAMPLE 1

An emulsion was prepared comprising:

| | |
|---|---|
| Styrene | 62.0 |
| Butadiene | 38.0 |
| Tertiary dodecyl mercaptan | 0.3 |
| Sequestering agent | 0.021 |
| Dodecyl benzene sodium sulfonate | 0.7 |
| Alpha acryloyloxy acetic acid | 2.0 |
| Electrolyte | 0.2 |
| Styrene butadiene seed polymer | 10.0 |
| Potassium persulfate | 0.6 |
| Water | 92.0 |

The initial and increment aqueous charges were adjusted to pH 10.5 with KOH. The initial aqueous charge containing the seed was charged to the reactor, purged with nitrogen, and heated to 85° C. Initial persulfate was charged and the monomer mixture and aqueous phase (containing the functional monomers) injections commenced and were added over a period of 6 hours. After completing the increment injections, the reactor contents were maintained at 85° C. for a further 2 hours. The latex was then steam stripped. The resulting latex was stable to mechanical shear and $Ca(OH)_2$. The latex had a charge density of 0.071 meg COOH per gram of polymer dry.

EXAMPLE 2

An emulsion was prepared, employing a standard batch polymerisation technique, comprising:

| | |
|---|---|
| Styrene | 58.0 |
| Butadiene | 40.0 |
| Tertiary dodecyl mercaptan | 0.3 |
| Water | 100.0 |
| Sodium dialkyl sulfosuccinates (Empimin MA) | 2.0 |
| TSPP | 0.25 |
| Alpha acryloyloxy acetic acid | 2.0 |
| Potassium persulfate | 0.4 |

The aqueous mixture containing functional monomer was adjusted to pH 10.5 with NaOH, charged to the reactor and purged with nitrogen. The styrene, tertiary dodecyl mercaptan and butadiene were charged with the reactor contents heated to 57° C. at which time the initiator was introduced. The reactor contents were maintained at 57° C. under agitation for a period of 12-14 hours. The resulting latex was stable to mechanical shear and $Ca(OH)_2$. The polymer had a surface charge of 0.064 meg COOH/gram dry.

We claim:

1. In a process for the preparation of a latex by the emulsion polymerization of a monomer mixture selected from the group consisting of:
    (A) monomer mixture comprising:
        (i) from 20 to 80 weight percent of a mixture comprising 100 to 75 weight percent of one or more $C_{8-12}$ vinyl aromatic monomers which are unsubstituted or substituted by a $C_{1-4}$ alkyl radical or a chlorine atom, and 0 to 25 weight percent of one or more $C_{2-8}$ alkenyl nitriles;
        (ii) from 80 to 19.5 weight percent of one or more $C_{4-6}$ conjugated diolefins which are unsubstituted or substituted by a chlorine atom;
        (iii) from 0.5 to 10 weight percent of one or more monomers of the formula:

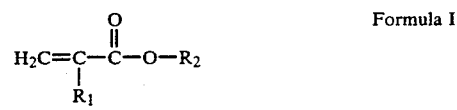

Formula I wherein $R_1$ is hydrogen or a $C_{1-6}$ alkyl radical and $R_2$ a radical of the formula (a)

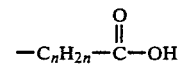

wherein n is an integer from 1 to 6; or (b)

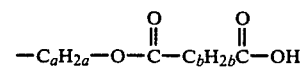

wherein a and b are integers from 1 to 4; and
    (iv) optionally up to 20 weight percent of one or more monomers selected from the group consisting of:

(a) $C_{1-8}$ alkyl and hydroxy alkyl esters of $C_{3-6}$ ethylenically unsaturated carboxylic acids;

(b) $C_{3-6}$ ethylenically unsaturated aldehydes; and (c) amides of $C_{3-6}$ ethylenically unsaturated carboxylic acids which amides are unsubstituted or substituted at the nitrogen atom by up to two radicals selected from the group consisting of $C_{1-4}$ hydroxyalkyl radicals;

(B) monomer mixtures comprising:

(i) from 5 to 39.5 weight percent of a mixture comprising 100 to 75 weight percent of one or more $C_{2-8}$ alkenyl nitriles and 0 to 35 weight percent of one or more vinyl aromatic monomers which are unsubstituted or substituted by a $C_{1-4}$ alkyl radical or a chlorine atom;

(ii) from 94.5 to 60 weight percent of one or more $C_{4-6}$ conjugated diolefins which are unsubstituted or substituted by a chlorine atom;

(iii) from 0.5 to 10 weight percent of a monomer of Formula I as defined above; and (iv) optionally up to 20 weight percent of one or more monomers selected from the group consisting of:

(a) $C_{1-8}$ alkyl and hydroxy alkyl esters of $C_{3-6}$ ethylenically unsaturated carboxylic acids;

(b) $C_{3-6}$ ethylenically unsaturated aldehydes; and (c) amides of $C-_{3-6}$ ethylenically unsaturated carboxylic acids which amides are unsubstituted or substituted at the nitrogen atom by up to two radicals selected from the group consisting of $C_{1-4}$ alkyl and $C_{1-4}$ hydroxalkyl radicals; monomer mixtures comprising:

(c) monomer mixtures comprising:

(i) from 99.5 to 70 weight percent of a monomer mixture comprising:

(a) from 100 to 80 weight percent of one or more halogenated $C_{2-6}$ aliphatic alkenyl monomers and (b) up to 20 weight percent of one or more monomers selected from the group consisting of $C_{1-8}$ alkenyl and hydroxy alkyl esters of $C_{3-6}$ ethylenically unsaturated carboxylated acids;

(ii) from 0.5 to 29.5 weight of one or more monomers of Formula I as defined above; and (iii) optionally up to 20 weight percent of one or more monomers selected from the group consisting of (a) $C_{3-6}$ ethylenically unsaturated aldehydes; and (b) amides of $C_{3-6}$ ethylenically unsaturated carboxylic acids which amides are unsubstituted or substituted at the nitrogen atom by up top two radicals selected from the group consisting of $C_{1-r}$ alkyl and $C_{1-4}$ hydroxyalkyl radicals;

the improvement characterized in that the polymerization takes place at a pH from 8.5 to 10.

2. A process according to claim 1 characterized in that the monomer mixture comprises:

from 40 to 70 weight percent of one or more monomers selected from the group consisting of styrene, alpha methyl styrene and acrylonitrile;

from 29.5 to 60 weight percent of one or more monomers selected from the group consisting of butadiene, isoprene, and chloroprene;

from 0.5 to 5 weight percent of one or more monomers selected from the group consisting of alpha-acryloyloxy acetic acid; beta acryloyloxy propionic acid; beta-methacryloyloxy propionic acid., alpha-methacryloyloxy acetic acid., gamma-acryloyloxy butanoic acid; gamma-methacryloyloxy butanoic acid., and up to 5 weight percent of one or more monomers selected from the group consisting of acrolein, methylacrylate, ethyl acrylate, butyl acrylate, methyl-methacrylate; ethyl methacrylate, butyl methacrylate, hydroxylethyl acrylate, ethyl-hexylacrylate, hydroxyethyl methacrylate, ethylhexyl methacrylate, acrylamide, methacrylamide, N-methylol acrylamide, and N-methylol-methacrylamide.

3. A process according to claim 1 wherein said monomer mixture comprises:

from 20 to 40 weight percent of one or more monomers selected from the group consisting of acrylonitrile or methacrylonitrile;

from 79.5 to 59.5 weight percent of one or more monomers selected from the group consisting of butadiene, isoprene, and chloroprene., from 0.5 to 5 weight percent of one or more monomers selected from the group consisting of alpha-acryloyloxy acetic acid; beta-acryloyloxy propionic acid; beta-methacryloyloxy propionic acid; alpha-methacryloyloxy acetic acid; gamma-acryloyloxy butanoic acid; gamma-methacryloyloxy butanoic acid; and up to 5 weight percent of one or more monomers selected from the group consisting of acrolein, methylacrylate, ethyl acrylate, butyl acrylate, methyl-methacrylate; ethyl methacrylate, butyl methacrylate, hydroxylethyl acrylate, ethyl-hexylacrylate, hydroxyethyl methacrylate, ethylhexyl methacrylate, acrylamide, methacrylamide, N-methylol acrylamide, and N-methylol-methacrylamide.

4. A process according to claim 1 wherein said monomer mixture comprises:

(i) from 99.5 to 80 weight percent of a monomer mixture comprising:

100 to 80 weight percent of vinyl or vinylidene chloride; and up to 20 weight percent. of one or more monomers selected from the group consisting of methyl acrylate, methyl methacrylate, ethyl acrylate, ethyl methacrylate and butyl acrylate;

(ii) from 0.5 to 19.5 weight percent of one or more monomers selected from the group consisting of alpha-acryloyloxy acetic acid; beta acrtyloyloxy propionic acid, beta methacryloyloxy propionic acid; alpha-methacryloyloxy acetic acid; gamma-acryloyloxy butanoic acid; and gamma-methacryloyloxy butanoic acid; and (iii) up to 5 weight percent of one or more monomers selected from the group consisting of acrolein, acrylamide, N-methylol acrylamide and N-methylol methacrylamide.

* * * * *

UNITED STATES PATENT AND TRADEMARK OFFICE
CERTIFICATE OF CORRECTION

PATENT NO. : 5,015,713

DATED : May 14, 1991

INVENTOR(S) : Peter R.J. Blanpain et al

It is certified that error appears in the above-identified patent and that said Letters Patent is hereby corrected as shown below:

Column 9, line 54, change "up top" to --up to--.

Column 9, line 56, change "$C_{1-r}$ alkyl" to --$C_{1-4}$ alkyl--.

Signed and Sealed this

Twenty-fourth Day of November, 1992

Attest:

DOUGLAS B. COMER

*Attesting Officer*     Acting Commissioner of Patents and Trademarks